… … …

[54] STORAGE-STABLE SOLUTION OF A COPPER PHTHALOCYANINE REACTIVE DYESTUFF

[75] Inventors: Joachim Wolff, Bergisch-Gladbach; Karlheinz Wolf, Leverkusen, both of Fed. Rep. of Germany

[73] Assignee: Bayer Aktiengesellschaft, Leverkusen, Fed. Rep. of Germany

[21] Appl. No.: 692,275

[22] Filed: Jan. 17, 1985

[30] Foreign Application Priority Data

Feb. 3, 1984 [DE] Fed. Rep. of Germany ....... 3403662

[51] Int. Cl.$^4$ .................... C09B 67/26; D06P 1/384
[52] U.S. Cl. .............................. 8/527; 8/549; 8/564; 8/585; 8/661; 8/686; 8/918
[58] Field of Search ................ 8/527, 661, 549

[56] References Cited

FOREIGN PATENT DOCUMENTS 2529658  1/1977  Fed. Rep. of Germany .

*Primary Examiner*—A. Lionel Clingman
*Attorney, Agent, or Firm*—Sprung Horn Kramer & Woods

[57] ABSTRACT

A new storage-stable solution of the reactive dyestuff of the formula

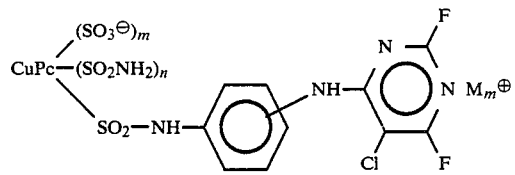

wherein
CuPc = the radical of a Cu phthalocyanine dyestuff,
m = 1, 2 or 3,
n = 1, 2 or 3,
m+n = 3 to 4 and
$M^\oplus = H^\oplus$, an alkali metal cation or an ammonium ion,
is provided.

The storage-stable solution according to the invention is characterized in that it contains 10–35% by weight of reactive dyestuff (1), 10–30% by weight of solubilizing agent, 0–10% by weight of anionic dispersing agent, 0–7% by weight of inorganic salts, such as $Na_2SO_4$, $Li_2SO_4$ and the like, and 0.1–3% by weight of buffer (pH 4–7), the remainder to make up to 100% by weight being water.

7 Claims, No Drawings

STORAGE-STABLE SOLUTION OF A COPPER PHTHALOCYANINE REACTIVE DYESTUFF

The present invention relates to a storage-stable solution of the reactive dyestuff of the formula

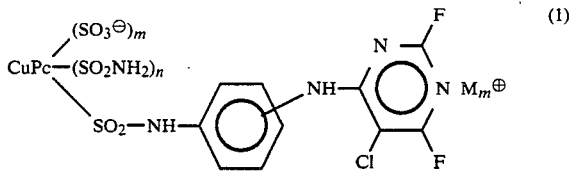

wherein
CuPc = the radical of a Cu phthalocyanine dyestuff,
m = 1, 2 or 3,
n = 1, 2 or 3,
m+n = 3 to 4 and
$M^{\oplus} = H^{\oplus}$, an alkali metal cation or an ammonium ion.

In formula (1), $M^{\oplus}$ preferably represents $Na^{\oplus}$ or $Li^{\oplus}$.

The storage-stable solution according to the invention is characterised in that it contains 10-35% by weight of reactive dyestuff (1), 10-30% by weight of solubilising agent, 0-10% by weight of anionic dispersing agent, 0-7% by weight of inorganic salts, such as $Na_2SO_4$, $Li_2SO_4$ and the like, and 0.1-3% by weight of buffer (pH 4-7), the remainder to make up to 100% by weight being water.

The storage-stable solution preferably contains 15-30% by weight of reactive dyestuff (1), 15-25% by weight of solubilising agent, 0-5% by weight of anionic dispersing agent, 0-4% weight of inorganic salts and 0.1-1% weight of buffer (pH 4-7), the remainder to make up to 100% by weight being water.

In particular, salts of the dyestuff which, in the form of the free acid, has the following formula are used:

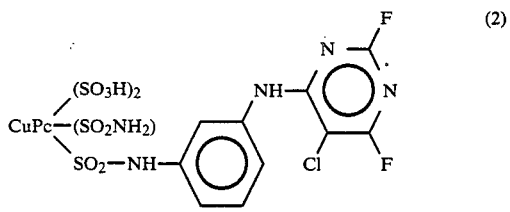

Stable solutions of reactive dyestuffs are already known. In British Pat. No. A 1,060,063, stable solutions of reactive dyestuffs are described, which are characterised in that they contain at least 10% of ε-caprolactam as a solubilising agent. No buffer additive has been mentioned either in the examples or in the patent claim. However, many 2,4,6-trifluoro-5-chloropyrimidine dyestuffs (cold-dyeing dyes) are not stable to hydrolysis over a prolonged period at elevated temperature (4 weeks at 50° C.) or over a period of years at 25° C. in this form without the addition of a buffer.

For this reason, 1-6% by weight of buffer substances which are not capable of a chemical reaction with the reactive group which reduces the tinctorial strength are added to aqueous reactive dyestuff formulations in German Pat. No. A 2,529,658. In the examples mentioned therein, however, no 2,4,6-trifluoro-5-chloropyrimidine reactive dyestuff (cold-dyeing dye) liquid formulations are mentioned in respect of their reactivity. According to the prior art, reactive liquid formulations with dyestuffs containing the 2,6-difluoro-5-chloro-pyrimidin-4-yl radical are more stable to hydrolysis at pH 7 than at pH 4-5. For this reason, buffer mixtures for the pH range from 6.5 to 8 were also used in German Pat. No. A 3,207,534.

Highly surprisingly, it has now been found that liquid formulations according to the invention, for example buffered to pH 4.5, are extremely stable towards hydrolysis over a prolonged period.

Preferred possible solubilising agents are: lower aliphatic or cyclic amides, such as ε-caprolactam, N-alkylpyrrolidones, N-vinylpyrrolidones and polymers thereof and/or aliphatic sulphoxides and/or sulphur-containing compounds, such as dimethyl sulphone and diethyl sulphone, and/or hydrotropic compounds, such as thiourea, urea and the associated derivatives, N,N'-dimethylurea, ε-caprolactam and dimethyl sulphone being particularly preferred.

Examples of possible anionic dispersing agents are: condensation products of an aromatic sulphonic acid and formaldehyde (such as, for example, naphthalene-sulphonic acid, ditolylether-sulphonic acid or terphenyl-sulphonic acid with formaldehyde).

Examples of possible buffers are: buffer systems which buffer in the pH range from 4 to 7 and are not capable of reaction with the reactive group which reduces the tinctorial strength, for example a boric acid/LiOH mixture, a boric acid/NaOH mixture, an $NaH_2PO_4/Na_2HPO_4$ mixture, a citric acid/citrate mixture and mixtures of the systems mentioned.

Preferred possible inorganic salts are: $Na_2SO_4$, $Li_2SO_4$, NaCl and LiCl. The fewer inorganic salts the liquid formulation according to the invention contains, the higher the dyestuff content with which it can be formulated.

Those dyestuffs which have as low as possible a content of inorganic salts (usually resulting from the synthesis) are advantageously used in the preparation of the liquid formulation according to the invention. Such formulations of low salt content can be obtained in various ways:

1. The reactive dyestuff is isolated from the synthesis liquor and filtered off with suction to the maximum possible dry content. The press-cake can then be washed with a little neutral or weakly acid water and subsequently dissolved in the solubilising agent described, and stabilised with buffer.

If the storage-stable solutions according to the invention contain only 10 to 20% by weight of dyestuff, the rinsing may possibly be dispensed.

2. However, German Pat. No. A 2,948,282 describes another process. The dilute salt-containing reaction liquor or a dilute aqueous solution of the dyestuff is subjected to pressure permeation, demineralised and concentrated.

3. The liquid grade according to the invention can furthermore also be prepared by the process described in German Pat. No. A 3,207,534.

EXAMPLE 1

300 g of reactive dyestuff with, in the form of the free acid, the formula (2) containing less than 10% by weight of inorganic salts, such as $Na_2SO_4$ and the like, are slowly introduced into a mixture consisting of 480 g of water and 200 g of ε-caprolactam at 30° C., the pH value being kept at 6.5 by addition of 8 g of $LiOH.H_2O$.

After dissolving, the formulation is stabilised at pH 5.5 with 5 g of boric acid and a little LiOH.H₂O. An extremely storage-stable solution containing about 27% by weight of pure dyestuff, 20% of ε-caprolactam, about 3.5% of inorganic salts, such as Na₂SO₄ and the like, 0.5% of boric acid and about 51% of water is obtained.

After this concentrated solution according to the invention has been stirred into water, a dyeing solution for dyeing natural and regenerated cellulose fibres in a turquoise blue shade is obtained by adding the auxiliaries customary for reactive dyeing.

EXAMPLE 2

242 g of reactive dyestuff of the formula (2) containing less than 10% by weight of inorganic salts are slowly introduced into a mixture consisting of 545 g of water and 200 g of N,N'-dimethylurea at 30° C., the pH value being kept at 6.5 by addition of 8 g of LiOH.H₂O.

After dissolving, the formulation is stabilised at pH 5.5 with 5 g of boric acid and a little LiOH.H₂O. An extremely storage-stable solution consisting of: about 22% weight of pure dyestuff with, in the free acid, the formula (2), 20% by weight of N,N'-dimethylurea, about 3% by weight of inorganic salts, such as Na₂SO₄ and the like, 0.5% by weight of boric acid/LiOH (pH=5.5) and about 54.5% by weight of water, is obtained.

The formulation prepared is used as described in Example 1.

EXAMPLE 3

The procedure described in Example 2 is followed, a mixture of 160 g of ε-caprolactam and 50 g of dimethyl sulphone being used instead of 200 g of N,N'-dimethylurea. The other conditions remain the same. A solution consisting of: about 22% by weight of pure dyestuff (2), 16% by weight of ε-caprolactam, 5% by weight of dimethyl sulphone, 3% by weight of inorganic salts, 0.5% by weight of boric acid/LiOH (pH=5.5) and about 53.5% by weight of water, is obtained.

The use of this solution is as described in Example 1.

EXAMPLE 4

The procedure described in Example 1 is followed, 5 g of a mixture of sodium dihydrogen phosphate/disodium hydrogen phosphate (pH=5.5) being used instead of 5 g of boric acid. The other conditions remain the same. A solution consisting of: about 27% by weight of pure dyestuff (2), 20% by weight of ε-caprolactam, about 3.5% by weight of inorganic salts, such as Na₂SO₄ and the like, about 0.5% by weight of a mixture of NaH₂PO₄/Na₂HPO₄ (pH=5.5) and about 51% by weight of water, is obtained.

The use of this solution is as described in Example 1.

We claim:

1. Aqueous solution of the reactive dyestuff of the formula

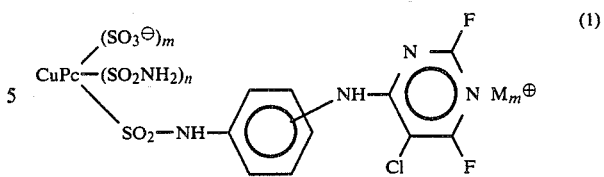

wherein
CuPc = the radical of a Cu phthalocyanine dyestuff,
m = 1, 2 or 3,
n = 1, 2 or 3,
m + n = 3 to 4 and
M⊕ = H⊕, an alkali metal cation or an ammonium ion, containing 10-35% by weight of reactive dyestuff (1), 10-30% by weight of solubilising agent selected from lower aliphatic or cyclic amides, N-alkylpyrrolidones, N-vinylpyrrolidones or polymers thereof, aliphatic sulphoxides, dimethylsulphone, diethylsulphone, thiourea and urea and the associated derivatives.
0-10% by weight of anionic dispersing agent,
0-7% by weight of inorganic salt and
0.1-3% by weight of buffer (ph 4-7).

2. Aqueous solution according to claim 1, characterised in that it contains 15-30% by weight of reactive dyestuff (1), 15-25% by weight of solubilising agent, 0-5% by weight of anionic dispersing agent, 0-4% by weight of inorganic salts and 0.1-1% by weight of buffer (pH 4-7).

3. Aqueous solution according to claim 1, characterised in that it contains the dyestuff of the formula

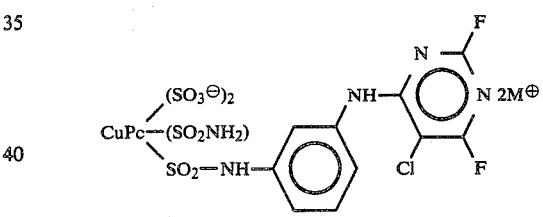

wherein
CuPc = the radical of a Cu phthalocyanine dyestuff and
M⁺ = H⁺, an alkali metal cation or an ammonium ion.

4. Aqueous solution according to claim 1, characterised in that it contains N,N'-dimethylurea, ε-caprolactam or dimethyl sulphone as the solubilising agent.

5. Aqueous solution according to claim 1, characterised in that Na₂SO₄, Li₂SO₄ and NaCl are contained as inorganic salts.

6. Aqueous solution according to claim 1, characterised in that a boric acid/LiOH mixture, a boric acid/NaOH mixture, an NaH₂PO₄/Na₂HPO₄ mixture, a citric acid/citrate mixture or mixtures of the systems mentioned are used as buffers.

7. Aqueous solution according to claim 1, characterised in that condensation products of an aromatic sulphonic acid and formaldehyde are used as the anionic dispersing agent.

* * * * *